(12) United States Patent
Leng

(10) Patent No.: US 11,297,946 B2
(45) Date of Patent: Apr. 12, 2022

(54) COMPOSITE STRUCTURE FOR FURNITURE

(71) Applicant: NEW-TEC INTEGRATION (XIAMEN) CO., LTD., Fujian (CN)

(72) Inventor: Luhao Leng, Xiamen (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 122 days.

(21) Appl. No.: 16/347,976

(22) PCT Filed: Feb. 23, 2017

(86) PCT No.: PCT/CN2017/074573
§ 371 (c)(1),
(2) Date: May 7, 2019

(87) PCT Pub. No.: WO2018/152739
PCT Pub. Date: Aug. 30, 2018

(65) Prior Publication Data
US 2019/0290003 A1    Sep. 26, 2019

(51) Int. Cl.
*A47C 7/16* (2006.01)
*A47B 96/20* (2006.01)
(Continued)

(52) U.S. Cl.
CPC ............ *A47B 96/206* (2013.01); *A47B 13/08* (2013.01); *A47C 7/16* (2013.01); *A47C 7/40* (2013.01);
(Continued)

(58) Field of Classification Search
CPC . A47B 96/206; A47B 2096/207; A47B 13/08; A47B 96/201; A47B 13/083; A47C 7/16
See application file for complete search history.

(56) References Cited

U.S. PATENT DOCUMENTS 2,865,437 A * 12/1958 Shwayder ............... A47C 7/16
297/55
3,431,022 A *  3/1969 Poppe .................... A47C 5/046
297/448.1
(Continued)

FOREIGN PATENT DOCUMENTS

CN    2339062 Y    9/1999
CN    2894416 Y    5/2007
(Continued)

OTHER PUBLICATIONS

State Intellectual Property Office, PRC China, International Search Report dated Nov. 29, 2017 for International Application No. PCT/CN2017/074573, 5 pages.
(Continued)

*Primary Examiner* — Timothy J Brindley
(74) *Attorney, Agent, or Firm* — Perkins Coie LLP; Kenneth H. Ohriner

(57) ABSTRACT

A chair (10) has a composite structure (14) attached to a frame (12). The composite structure includes a plastic plate (16) having an edge (22), and a metal plate (18) having a peripheral crimp (21) including a gap (20), with the edge of the plastic plate inserted into the gap and with the peripheral crimp clamped onto the edge of the plastic plate, to attach the plastic plate onto the metal plate. The composite structure provides a seating surface of the chair. The composite structure maximizes the advantages of both the plastic plate and the metal plate, with each plate compensating for the disadvantages of the other.

18 Claims, 8 Drawing Sheets

(51) Int. Cl.
    *A47B 13/08*    (2006.01)
    *A47C 7/40*     (2006.01)
    *B32B 15/08*    (2006.01)
    *B32B 15/18*    (2006.01)
    *B32B 15/04*    (2006.01)

(52) U.S. Cl.
    CPC .............. *B32B 15/04* (2013.01); *B32B 15/08* (2013.01); *B32B 15/18* (2013.01); *A47B 96/201* (2013.01); *B32B 2479/00* (2013.01)

(56) References Cited

U.S. PATENT DOCUMENTS

| | | | |
|---|---|---|---|
| 3,463,547 A * | 8/1969 | Brennan | A47C 7/029 297/452.25 |
| 4,169,628 A | 10/1979 | Weber et al. | |
| 2007/0296249 A1 | 12/2007 | Tao et al. | |
| 2009/0324872 A1 | 12/2009 | Leng | |
| 2016/0082687 A1 | 3/2016 | Inami et al. | |
| 2020/0352331 A1* | 11/2020 | Graf | A47B 96/20 |

FOREIGN PATENT DOCUMENTS

| | | |
|---|---|---|
| CN | 101011929 A | 8/2007 |
| CN | 202525607 U | 11/2012 |
| CN | 202831529 U | 3/2013 |
| CN | 105437538 A | 3/2016 |
| EP | 0784953 A1 | 7/1997 |

OTHER PUBLICATIONS

State Intellectual Property Office, PRC China, Written Opinion of the International Searching Authority dated Nov. 29, 2017 for International Application No. PCT/CN2017/074573, 4 pages.

* cited by examiner

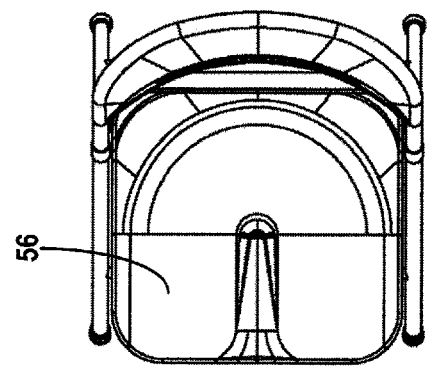
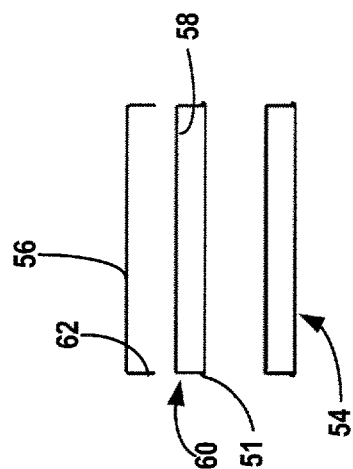
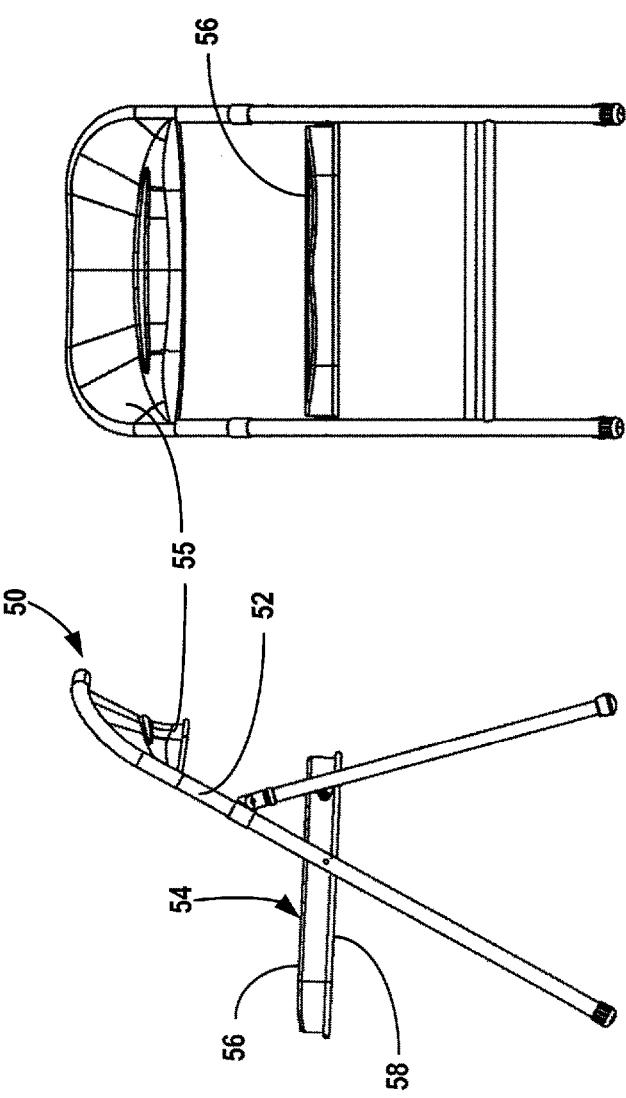
Fig. 12
Fig. 10
Fig. 11
Fig. 9

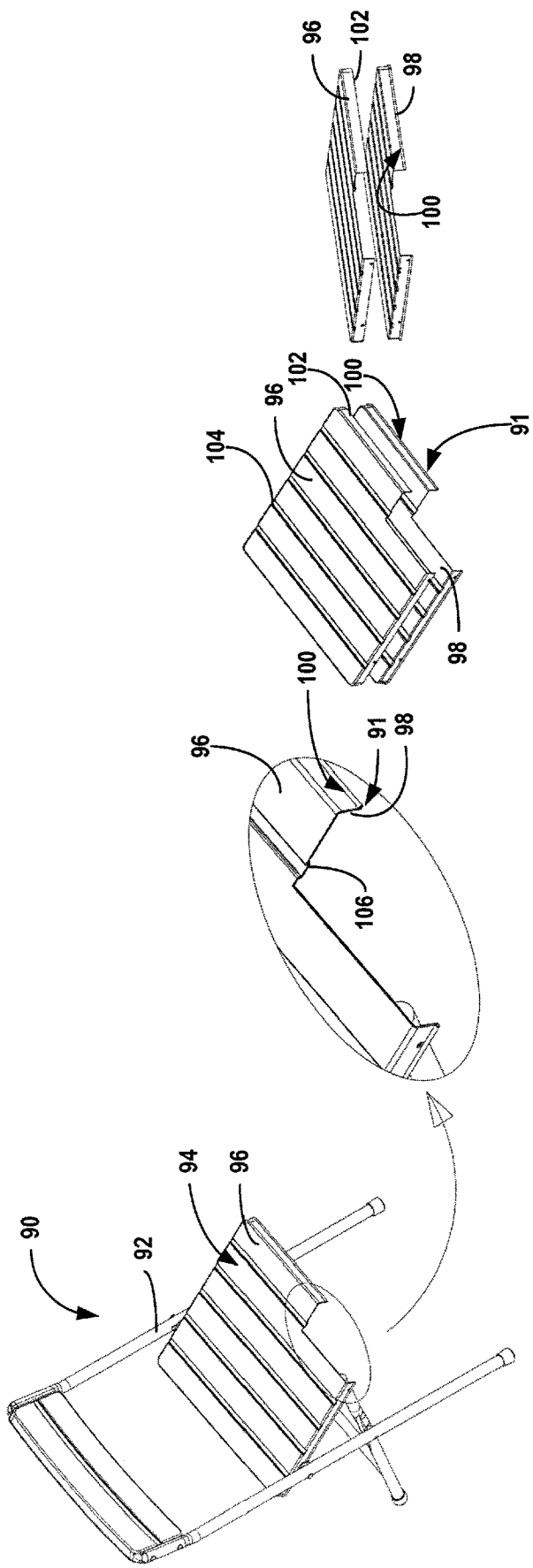

COMPOSITE STRUCTURE FOR FURNITURE

TECHNICAL FIELD

The field of the invention relates to a composite structure of a metal plate and a plastic plate for use in furniture.

BACKGROUND

Solid and shaped wood plates are commonly used to manufacture furniture, such as tables, chair seats and backrests, horizontal and vertical partition plates for bookshelves or cabinets, drawers and so on. However, these materials consume large amounts of wood. Increasingly, plastic plates are now used in place of wood plates. Plastic plates are produced either by injection molding or blow molding. Injection molded plastic plates tend to have limited strength. While blow molded plastic plates have an attractive appearance and are easy to clean, blow molded plates are also relatively thicker. Especially for larger furniture products, blow molded plates are made in long production cycles with low efficiency. Larger blow molded plates also require very large molds and blow molding machines performing complicated production processes. As a result, production costs are high. Directly machined metal plates are also used in furniture manufacturing. However, machined metal plates have a single surface color and texture, which limits their uses.

BRIEF STATEMENT OF THE INVENTION

A composite structure of a plastic plate and a formed metal plate is provided, wherein the plastic plate and formed metal plate are joined together to maximize the advantages of both the plastic plate and the metal plate, with each plate compensating for the disadvantages of the other. The plastic plate may be vacuum molded. In this case, the composite structure not only has the same surface quantity and variations as vacuum molded products, but it also has improved overall strength, yet with a significantly reduced amount of material. Accordingly, the composite structure provides high strength with lower cost.

In one aspect, a composite structure for use in furniture includes an integral plastic plate. A metal plate is formed from at least one metal sheet. The plastic plate and the metal plate are optionally bonded together with adhesive after being formed. An edge at the periphery of the plastic plate is inserted into a gap formed in a peripheral crimp along the periphery of the metal plate. The metal plate primarily provides strength to the composite structure.

Optionally, a texture imitating natural wood or stone is affixed to a surface of the plastic plate such that the appearance of the plastic plate simulates a natural material. A surface of the plastic plate may be vacuum molded with grooves of various shapes to make it look more natural. In this case, a complimentary surface of the metal plate may be molded with corresponding grooves to support the vacuum molded plastic plate while increasing the strength of the composite structure. The metal plate may be formed via stretching and curling or bending.

BRIEF DESCRIPTION OF THE DRAWINGS

In the drawings,

FIG. 9 is a side view of a third embodiment of a chair having a composite structure seating surface.

FIG. 10 is a front view of the chair shown in FIG. 9.

FIG. 11 is a top view of the chair shown in FIG. 9.

FIG. 12 is a schematic section view of the composite structure shown in FIG. 9.

FIG. 16 is a perspective view of a fifth embodiment of a chair having a composite structure seating surface.

FIG. 17 is a perspective section view of the composite structure shown in FIG. 16.

FIG. 18 is an exploded perspective view of the composite structure shown in FIG. 16.

FIG. 19 is an alternative exploded perspective view of the composite structure shown in FIG. 16.

DETAILED DESCRIPTION

Figure 4:
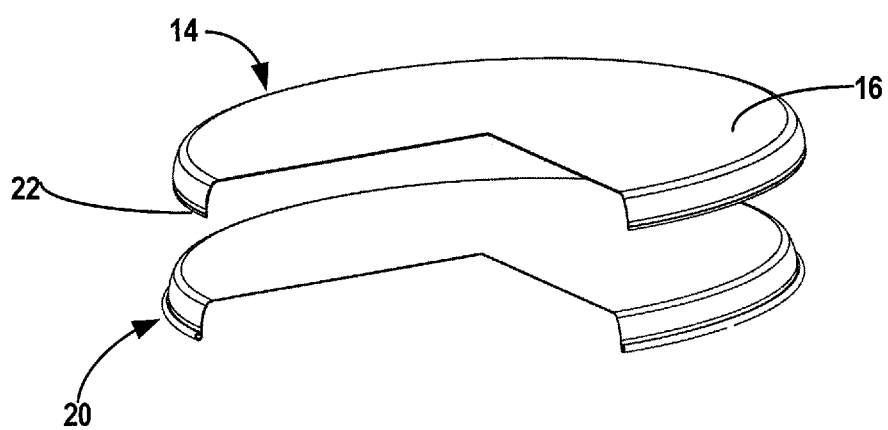
FIG. 4 is an exploded perspective view in part section of the composite structure shown in FIG. 1.
Figure 5:
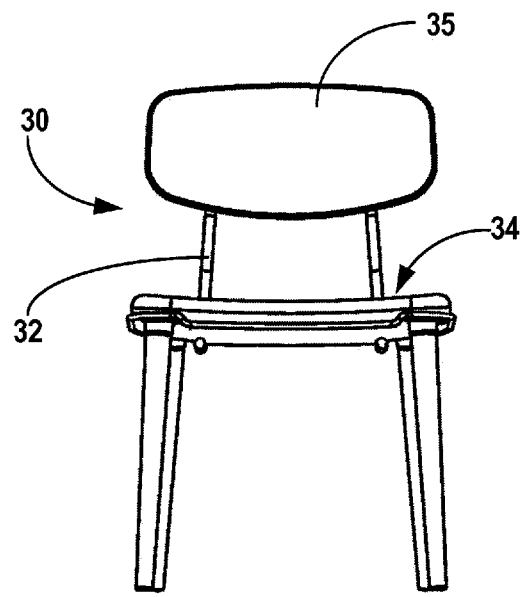
FIG. 5 is a front view of a second embodiment of a chair having a composite structure seating surface.

In a first embodiment as shown in FIGS. 1-4, a chair 10 has a composite structure 14 pivotally attached to a frame 12 in a way to allow the chair 10 to fold, for example with rear legs of the frame attached to the composite structure 14 at left and right front pivot joints, and with front legs of the frame attached to the composite structure 14 at left and right rear pivot joints. As shown in FIGS. 2A and 4, the composite structure 14 may be round and include a vacuum molded plastic plate 16 attached on top of a formed metal plate 18. The composite structure 14 may optionally be attached to the frame using a locking, riveting, or snap mechanism.

Figure 1:
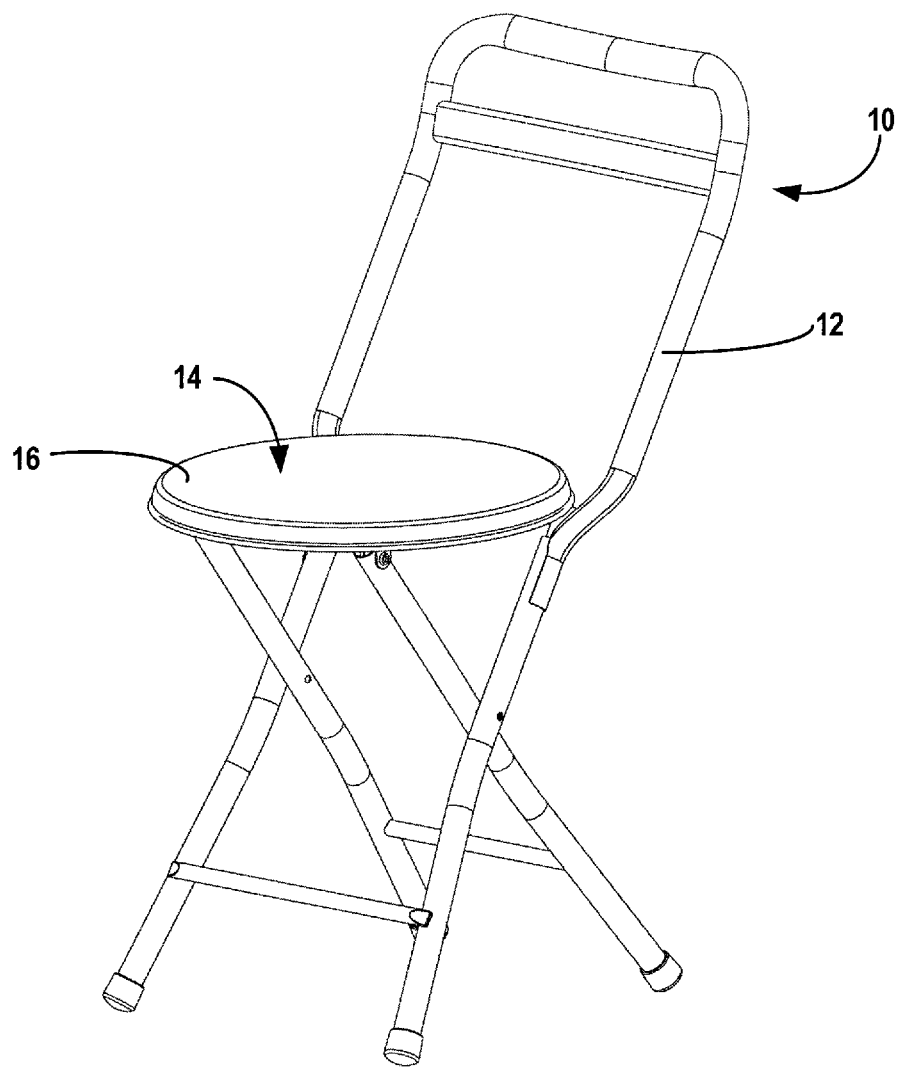
FIG. 1 is a perspective view of a first embodiment of a chair having a composite structure seating surface.
Figure 2A:
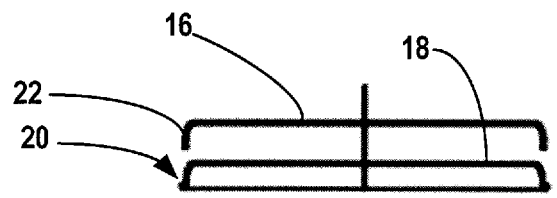
FIG. 2A is an exploded section view of the composite structure shown in FIG. 1.
Figure 2B:
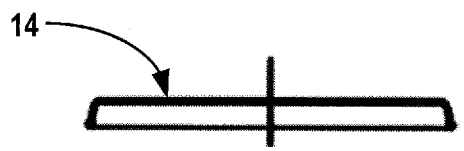
FIG. 2B is an assembled section view of the composite structure shown in FIG. 1.
Figure 3:
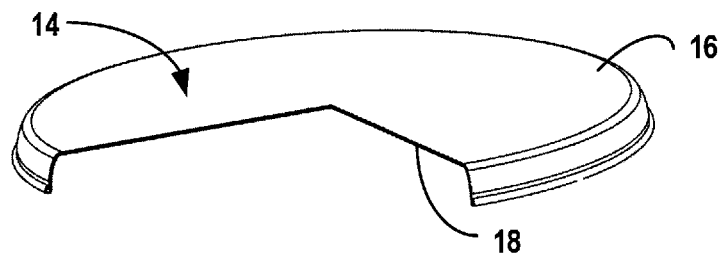
FIG. 3 is a perspective view in part section of the composite structure shown in FIG. 1.
Figure 20:
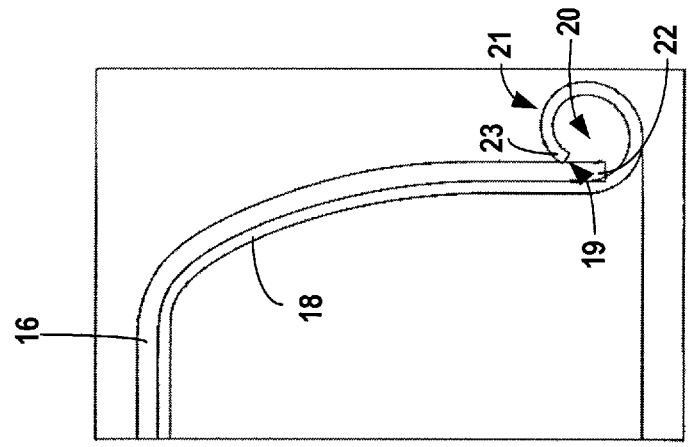
FIGS. 20-22 are enlarged detail views of optional peripheral crimps for use on the metal plate of the composite structures shown in FIGS. 1-19.

As shown in FIG. 2A, a peripheral crimp 21 may be formed around the circumference of the metal plate 18, for example by rolling or forming the circumferential edge of the metal plate. Referring momentarily to FIG. 20 which shows the details of the peripheral crimp 21, a downward protruding edge 22 of the plastic plate 16 is inserted into a gap 20 in the peripheral crimp 21. The edge 22 is generally perpendicular to the plane of the plastic plate 16, which generally is a flat disk. The diameter or outer dimension of the edge 22 is sized to fit into the gap 20. A lower end 23 of the metal plate 18 is then rolled, closed or clamped with the bottom edge 19 of the metal plate 18 contacting the edge 22 of the plastic plate 16, to securely attach the plastic plate 16 onto the metal plate 18. In the example shown in FIG. 20, the lower end 23 of the metal plate is formed into a three quarter circle. The lower end 23 may be partially forced into the downward protruding edge 22 of the plastic plate 16. Also as shown in FIG. 20, the metal plate 18 has a thickness that may be 0.2 or 0.4 to 1.0 of the thickness of the plastic plate.

Figure 21:
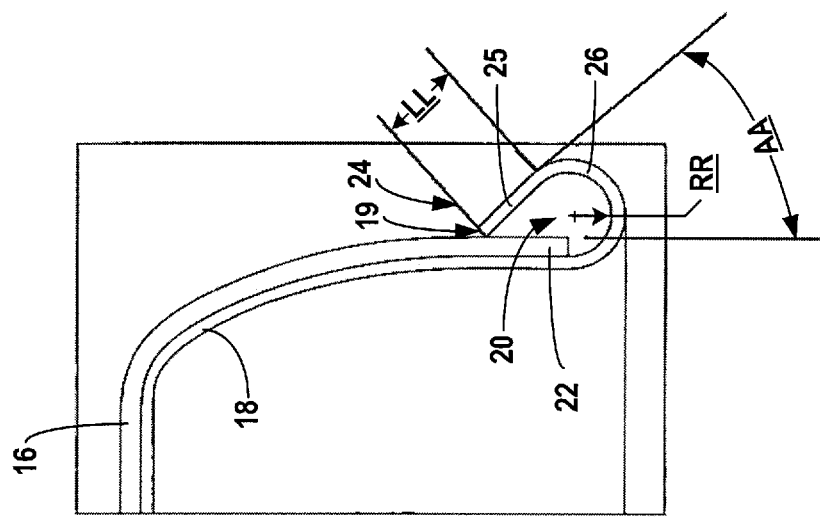
Figure 22:
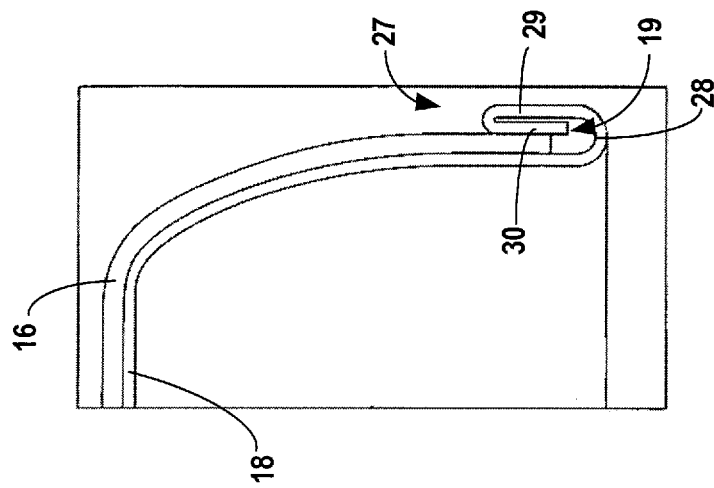

FIGS. 21 and 22 show alternative peripheral crimp designs. In FIG. 21, the peripheral crimp 24 is similar to the peripheral crimp 21 shown in FIG. 20, except that the lower end of the metal plate 18 is formed with a straight section 25 which extends up from a radius section 26 and engages the downward protruding edge 22 of the plastic plate 16 at an angle AA, of for example 20° to 75°. The straight section 25 has a length LL which is typically 1 to 2.5 times the radius RR of the radius section 26.

FIG. 22 shows another alternative peripheral crimp design 27 having a second straight section 30 folded flat against a first straight section 29 adjoining a U-shaped radius section 28. In this design, the second straight section 30 is clamped against the downward protruding edge 22 of the plastic plate, rather than having the bottom edge 19 of the metal plate 18 contacting the downward protruding edge 22 of the plastic plate.

The edge 22 of the plastic plate inserted into the peripheral crimp 21 may be continuous (i.e., forming a complete circle), or it may be provided in the form of spaced apart segments. The peripheral crimp 21 may be correspondingly formed as a continuous crimp or as spaced apart crimp segments. Although the peripheral crimp 21 is shown in FIGS. 20-22 with a radius, other designs may also be used, e.g., such as U-shaped, G-shaped or C-shaped crimps.

Figure 6:
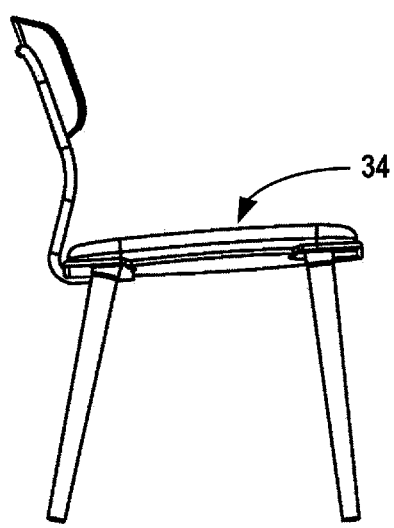
FIG. 6 is a side view of the chair shown in FIG. 5.
Figure 7:
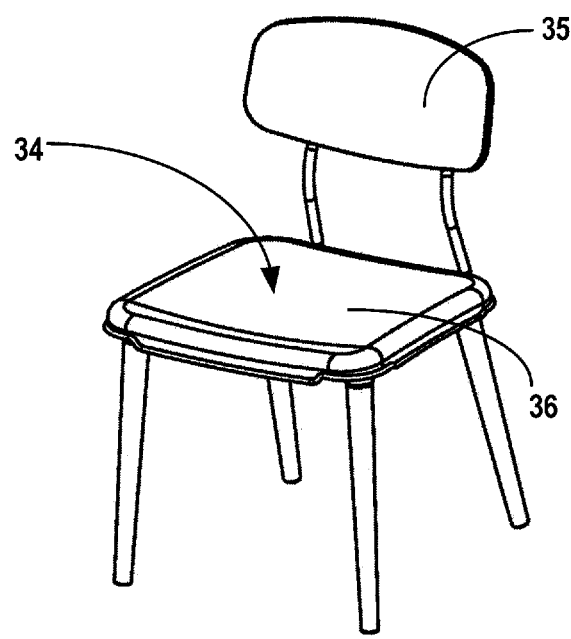
FIG. 7 is a perspective view of the chair shown in FIG. 5.
Figure 8:
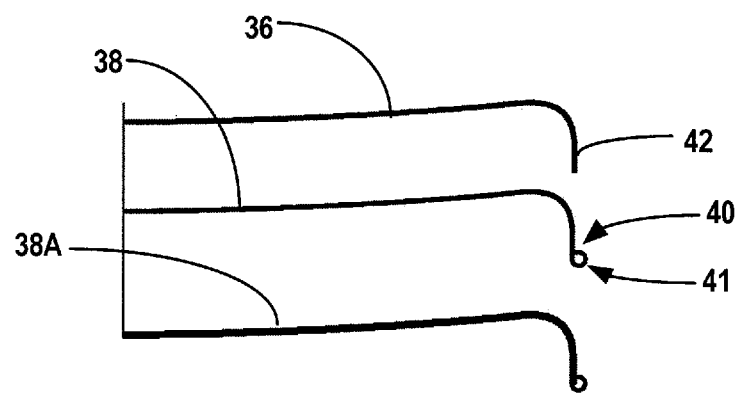
FIG. 8 is a schematic section view of the composite structure shown in FIG. 5.

Turning to FIGS. 5-8, in a second embodiment 30, a composite structure 34 is attached to a rigid, non-folding frame 32. A back rest 35 is also attached to the frame 32. The back rest 35 may optionally be provided as a composite structure having the same design as the composite structure 34 described below, although with the back rest 35 having a shape different from the composite structure 34 which provides a seating surface. As shown in FIG. 6-8, the composite structure 34 has a plastic plate 36 attached to a metal plate 38 via an edge 42 of the plastic plate 36 inserted and clamped into a peripheral crimp 41 having a gap 40, similar to the first embodiment 10. In the second embodiment 30 the plastic and metal plates 36 and 38 have the same size and shape, although they are not round as in the first embodiment 10. Rather, in the second embodiment 30 the plastic and metal plates 36 and 38 are generally square with rounded corners.

FIG. 8 more clearly illustrates the combination of the plastic panel 36 and the metal panel 38, wherein the bold line designated with 38A refers to the overlapped surfaces of the plastic panel 36 and the metal panel 38 after joined. As shown in FIG. 8, the edge 42 of the plastic panel 36 protrudes downwardly and snaps into the gap 40 in the peripheral crimp 41 of the metal panel 38.

Referring now to FIGS. 9-12, in a third embodiment 50, a composite structure 54 is pivotally attached to a frame 52 to provide a seating surface. A back rest 55 may also be attached to the frame 52. As schematically shown in FIG. 12, a plastic plate 56 is attached to a metal plate 58 to form the composite structure 54. As with the embodiments above, a peripheral crimp 51 is provided around the perimeter of the metal plate 58, with an edge 62 of the plastic plate inserted into a gap 60 in the peripheral crimp 51. The peripheral crimp 51 is then closed or clamped onto the edge 62 of the plastic plate 56, using known metal forming techniques. The peripheral crimp 51 preferably is provided on all four sides of the metal plate 58, although in some designs the peripheral crimp 51 may only be provided on two opposite sides of the metal plate 58.

Figure 13:
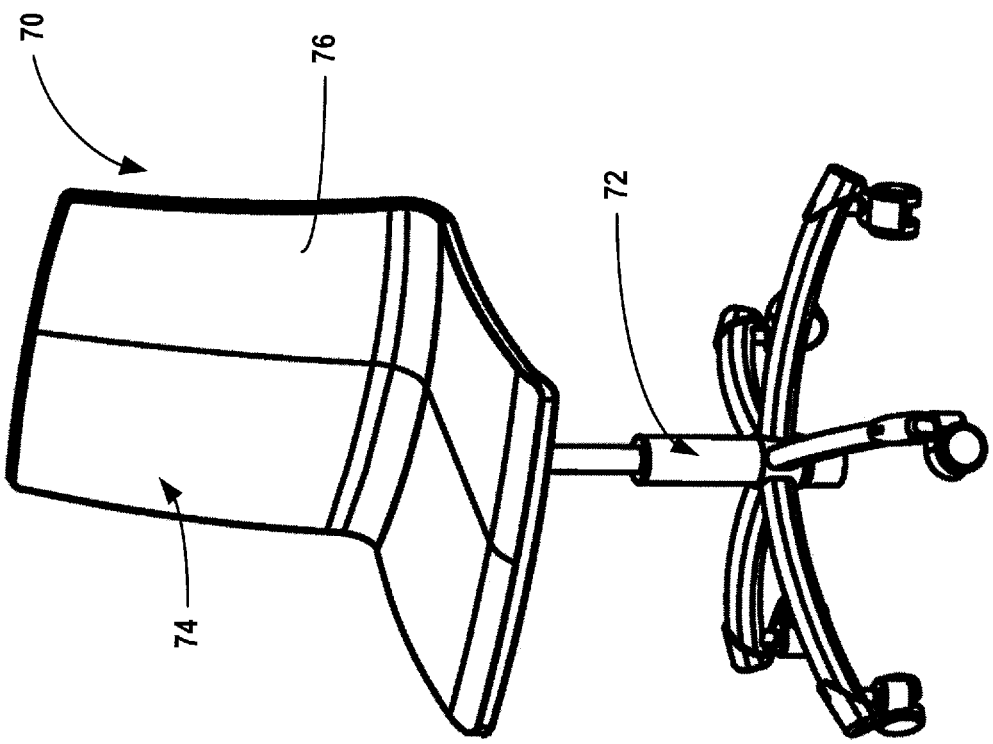
FIG. 13 is a perspective view of a fourth embodiment of a chair having a composite structure seating surface and back rest surface.
Figure 14:
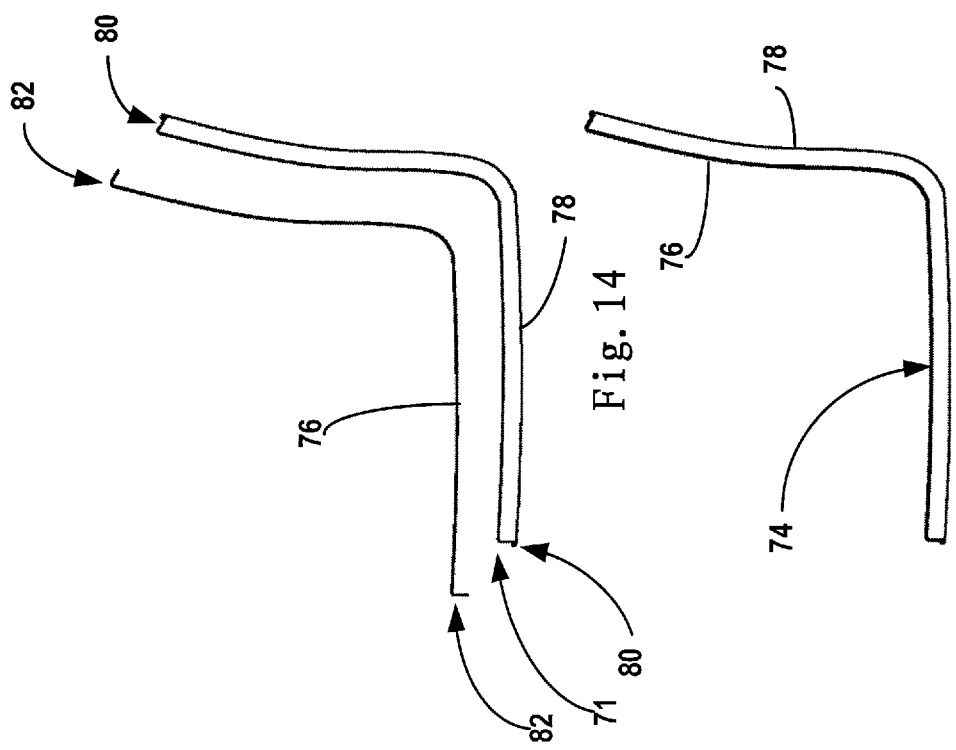
FIG. 14 is an exploded schematic side section view of the chair shown in FIG. 13.
Figure 15:
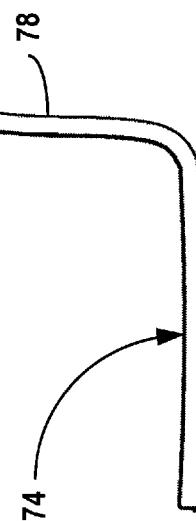
FIG. 15 is a side view of the composite structure seating surface and back rest surface shown in FIG. 13.

FIGS. 13-15 show a fourth embodiment having a composite structure 74 pivotally attached onto a rolling base 72. The composite structure 74 provides both a seating surface and a back rest, optionally in a single integrally formed unit. The composite structure includes a plastic plate 76 attached to a metal plate 78. Both the plastic plate 76 and the metal plate 78 may generally have an L-shape. As with the embodiments above, a peripheral crimp 71 is provided on the front and top edges of the metal plate 78, and optionally also along the side edges of the metal plate 78. A downward projecting edge or lip 82 of the plastic plate 76 is inserted into a gap 80 in the peripheral crimp 71, and the peripheral crimp 71 is then clamped close to permanently and securely attach the plastic plate 76 onto the metal plate 78. Although referred to as plates, the plastic plate 76 and the metal plate 78 in this embodiment are not flat, but rather are three-dimensional so as to provide both seating and back rest surfaces.

Referring now to FIGS. 16-19, a fifth embodiment 90 has a composite structure 94 pivotally attached to a frame 92. The composite structure 94 includes a plastic plate 96 attached to a metal plate 98 using a peripheral crimp 91 on the metal plate 98, as described in the embodiments discussed above. An edge 102 of the plastic plate 96 is inserted into a gap 100 in the peripheral crimp 91. As shown in FIGS. 18 and 19, in this embodiment, downward projections 104 formed in the plastic plate 96 may engage or project into corresponding grooves 106 formed in the metal plate 98.

In each of the embodiments, the plastic plate may be a vacuum molded plastic plate, and the metal plate may be a formed or stretched metal plate. In addition, in each of the embodiments, more than one plastic plate or metal plate may be used. The plastic plate may also optionally be bonded to the metal plate using an adhesive, in addition to the peripheral crimp. The features described relative to one embodiment can of course also be used be used in the other embodiments. The composite structures described above for use in chairs may of course also be used for tables, shelves, backrests, partition plates for bookshelves or cabinets, drawers, and other furniture components.

Thus, multiple embodiments have been shown and described. Various changes and substitutions may of course be made without departing from the spirit and scope of the invention. The invention, therefore, should not be limited, except by the following claims and their equivalents.

What is claimed is:

1. A chair comprising:
   a frame;
   a composite structure attached to the frame;
   the composite structure including a plastic plate having an edge, and a metal plate having an edge;
   the edge of the metal plate extending beyond the edge of the plastic plate;
   the edge of the metal plate having a curved section which curves to the outside of the seating surface; and
   the composite structure providing a seating surface of the chair.

2. The chair of claim 1 wherein an end of the curved section touches the edge of the plastic plate.

3. The chair of claim 1 wherein an end of the curved section is clamped into the edge of the plastic plate.

4. The chair of claim 1 wherein the plastic plate includes surface texture imitating natural wood or stone.

5. The chair of claim 1 wherein the metal plate is formed via stretching and curling or bending.

6. The chair of claim 1 wherein the composite structure is round.

7. The chair of claim 1 wherein the curved section subtends an arc of greater than 180 degrees.

8. The chair of claim 1 wherein the curved section subtends an arc of greater than 270 degrees.

9. The chair of claim 1 wherein the composite structure is attached to the frame by a locking, riveting, or snap mechanism.

10. The chair of claim 1 further including a straight section extending from the curved section and an end of the straight section touches the edge of the plastic plate.

11. A chair comprising:
a frame;
a composite structure attached to the frame;
the composite structure including a plastic plate having an edge, and a metal plate having an edge;
the edge of the metal plate extending beyond the edge of the plastic plate;
the edge of the metal plate having a curved section;
the composite structure providing a seating surface of the chair; and
a first straight section joined to the curved section, and a second straight section joined to the first straight section and folded over parallel to the first straight section.

12. The chair of claim 1 wherein the edge of the metal plate has no straight section and an end of the curved section touches the edge of the plastic plate.

13. Furniture comprising:
a frame;
a composite structure attached to the frame;
the composite structure including a plastic plate having an edge, and a metal plate having an edge extending past the edge of the plastic plate;
the edge of the metal plate having a curved section curving to the outside of the composite structure;
a gap between an end of the curved section and the edge of the metal plate;
the edge of the plastic plate in the gap; and
the end of the curved section touching the edge of the plastic plate.

14. The furniture of claim 13 wherein the end of the curved section is partially forced into the lower edge of the plastic plate.

15. The furniture of claim 13 wherein a lower end of the metal plate has a second straight section folded flat against a first straight section adjoining a U-shaped radius section, and wherein the second straight section is clamped against the edge of the plastic plate.

16. A chair comprising:
a frame;
a composite structure attached to the frame;
the composite structure including a plastic plate having an edge, and a metal plate having a peripheral crimp including a curved section, a first straight section folded parallel to a second straight section, and a gap, with the edge of the plastic plate inserted into the gap and with the peripheral crimp clamped onto the edge of the plastic plate; and
the composite structure providing a seating surface of the chair.

17. The chair of claim 16 wherein the composite structure is attached to the frame by a locking, riveting, or snap mechanism.

18. The furniture of claim 16 wherein the end of the curved section is partially forced into the lower the edge of the plastic plate.

\* \* \* \* \*